(12) United States Patent
Becker et al.

(10) Patent No.: US 8,473,094 B2
(45) Date of Patent: Jun. 25, 2013

(54) METHOD AND APPARATUS FOR GRIPPING AND TRANSFERRING PIECES OF LUGGAGE

(75) Inventors: Felix Becker, Munich (DE); Peter Rosenmeyer, Munich (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 490 days.

(21) Appl. No.: 12/739,799

(22) PCT Filed: Oct. 27, 2008

(86) PCT No.: PCT/DE2008/001744
§ 371 (c)(1),
(2), (4) Date: Apr. 26, 2010

(87) PCT Pub. No.: WO2009/056105
PCT Pub. Date: May 7, 2009

(65) Prior Publication Data
US 2010/0239408 A1    Sep. 23, 2010

(30) Foreign Application Priority Data

Oct. 31, 2007 (DE) .......................... 10 2007 052 012

(51) Int. Cl.
*B65G 47/91* (2006.01)
(52) U.S. Cl.
USPC ............ 700/213; 294/65; 294/99.1; 414/426; 414/627; 414/796
(58) Field of Classification Search
USPC ...................................................... 700/213
See application file for complete search history.

(56) References Cited

U.S. PATENT DOCUMENTS

| | | | | |
|---|---|---|---|---|
| 4,252,497 A * | 2/1981 | Burt | ............................... | 414/627 |
| 4,741,567 A * | 5/1988 | Zimmer et al. | .................... | 294/2 |
| 4,910,864 A * | 3/1990 | Elliott | .............................. | 29/740 |
| 4,911,608 A * | 3/1990 | Krappitz et al. | .............. | 414/796 |
| 5,967,739 A | 10/1999 | Bennison | | |
| 5,975,837 A | 11/1999 | Focke et al. | | |
| 6,022,187 A | 2/2000 | Focke et al. | | |
| 6,580,046 B1 | 6/2003 | Koini et al. | | |
| 6,652,014 B2 | 11/2003 | Schmalz et al. | | |

(Continued)

FOREIGN PATENT DOCUMENTS

| DE | 3234216 | 3/1984 |
|---|---|---|
| DE | 4328155 | 2/1995 |

(Continued)

*Primary Examiner* — Gene Crawford
*Assistant Examiner* — Kyle Logan
(74) *Attorney, Agent, or Firm* — Duane Morris LLP; J. Rodman Steele, Jr.; Gregory M. Lefkowitz

(57) ABSTRACT

A method and an apparatus for automatically removing pieces of luggage that have different surface properties and dimensions and getting the pieces of luggage ready for further transport by means of a gripper that is hingedly connected to a robot arm is described. The method includes: a) moving the gripper and the container that is to be emptied close together; b) determining the first piece of luggage to be removed; (c) gripping the piece of luggage using a horizontal suction elements (3) and withdrawing the luggage horizontally; d) if the vertical suction elements (4) are not yet able to sufficiently grip the luggage, the vertical suction elements (4) are repositioned and turned off, the vertical suction elements (5) are repositioned, and then turned on to re-grip the piece of luggage.

20 Claims, 5 Drawing Sheets

U.S. PATENT DOCUMENTS

| | | |
|---|---|---|
| 6,817,639 B2 | 11/2004 | Schmalz et al. |
| 7,677,622 B2 | 3/2010 | Dunkmann et al. |
| 2001/0052708 A1* | 12/2001 | Schmalz et al. ................ 294/65 |
| 2002/0020607 A1 | 2/2002 | Nagel et al. |
| 2005/0218679 A1* | 10/2005 | Yokoyama et al. .......... 294/99.1 |
| 2007/0006940 A1* | 1/2007 | Perlman et al. ................. 141/65 |
| 2007/0255447 A1 | 11/2007 | Dunkmann et al. |
| 2008/0101681 A1* | 5/2008 | Schmiegel .................... 382/141 |
| 2008/0111388 A1* | 5/2008 | Kniss ............................. 294/65 |
| 2010/0272547 A1* | 10/2010 | Cottone et al. ................ 414/426 |

FOREIGN PATENT DOCUMENTS

| | | |
|---|---|---|
| DE | 100 15 778 | 10/2001 |
| DE | 10 2005 022 828 | 11/2006 |
| EP | 0841297 | 5/1998 |

* cited by examiner

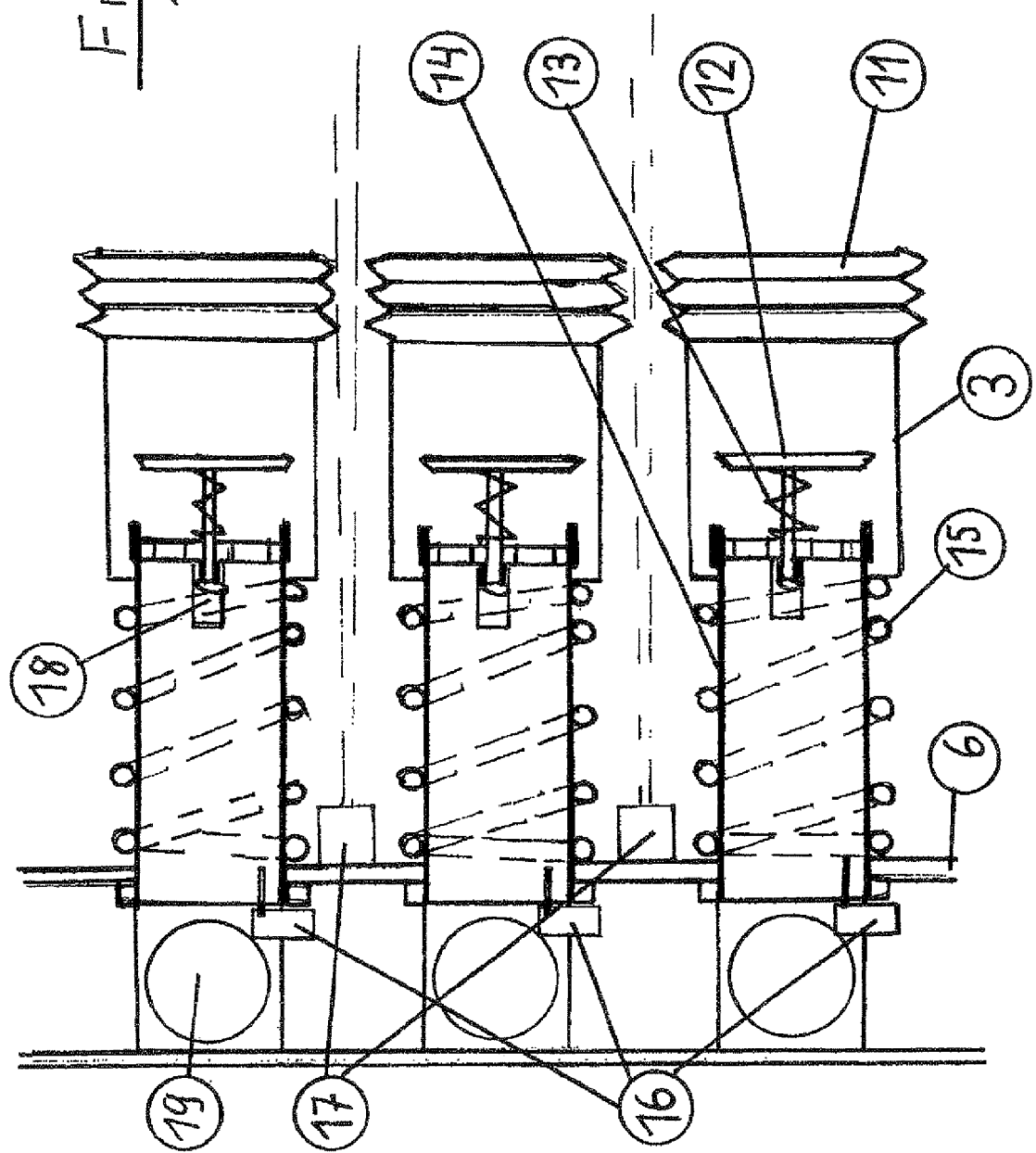

METHOD AND APPARATUS FOR GRIPPING AND TRANSFERRING PIECES OF LUGGAGE

CROSS-REFERENCE TO RELATED APPLICATIONS

This application is a §371 national stage entry of International Application No. PCT/DE2008/001744, filed Oct. 27, 2008, which claims priority to German Patent Application No. 10 2007 052 012.5, filed Oct. 31, 2007, both of which are hereby incorporated by reference.

BACKGROUND

The main area of application of the present invention is the transfer of pieces of luggage in the conveyance of passengers. National and international air traffic demands a particularly rapid and careful treatment of individual pieces of luggage. In order to cope with the rising volume of luggage resulting from ever-increasing air traffic, airport operators are keen to explore and subsequently also to exploit all possibilities for streamlining and optimizing flight luggage logistics. For this purpose, they seek to increase the throughput of existing luggage distribution regions and also the productivity of staff working therein. In airport luggage distribution regions, the basic activities of transporting, identifying and sorting pieces of luggage are nowadays already automated for the most part. In contrast thereto, loading auxiliary means, such as containers or transport trolleys, are in practice currently still loaded and unloaded with pieces of luggage entirely by hand. The main reason for this is the broad range of pieces of luggage which are to be transported and are generally composed of what is known as normal luggage and special luggage (bulky luggage). The normal luggage region at airports will be examined hereinafter by way of example. The term "normal luggage" refers for example to containers such as suitcases, bags, rucksacks, cardboard boxes and so on. The container itself can be made of metal, leather, any type of woven fabric, plastics material, wood, cardboard or similar materials. Normal luggage generally weighs between 2 kg and 50 kg at an average weight of approx. 18 kg. The dimensions of normal luggage are 20 cm to 100 cm in length, 10 cm to 50 cm in height and 10 cm to 70 cm in width. In the past, the different materials and also the differing rigidity of the individual pieces of luggage have prevented reliable automatic loading and unloading. However, manual loading and unloading of pieces of luggage forms a bottleneck in the throughput of the distribution of luggage at airports. In addition, it increases costs and has a harmful effect on the health of the staff working therein. An attempted solution for the handling of pieces of luggage in the processing of luggage at airports is known from IE 100 15 778 A1. In this case, a specific treatment of a dolly is proposed for unloading or transferring pieces of luggage which are arranged in containers, known as ULDs (=unitized load devices), the containers being transported by means of trailers, referred to as dollies, and brought to a luggage conveying facility, where the dolly is arranged with the container loaded with luggage and/or cargo in each case laterally at a distance next to a conveying belt pertaining to the luggage conveying facility; from this, the pieces of luggage are conveyed onward to a conveying belt, for example. Claim 1 of said document claims that the dolly is brought directly up to an unloading apparatus, that the dolly is aligned with a loading station and that the container, after reaching the loading station, is secured thereto and that the container is tilted in the direction of conveyance, so that the pieces of luggage located therein slip in a gravity-dependent manner in the tilting direction onto an adjoining conveying belt which pertains to the luggage conveying facility and via which they are conveyed to the luggage reclaim. Although such a process of the more less controlled tipping of the pieces of luggage does not require staff to transfer or pick up the pieces of luggage, other staff are needed in order to move the dolly exactly to the respective point of the conveying belt and also to make sure that no pieces of luggage fall beyond the conveying belt. In addition, staff are required in order to uncouple the trailers from the overall train of trailers, in each case after the loading station is reached, before the tilting process is initiated.

A further apparatus for handling articles, in particular nieces of luggage, with a carrying arm which is freely movable in at least two axes and is articulated to a central unit positioned at the end of a conveying track for articles, in particular a conveying belt, the movement of the carrying arm being controlled in a predefinable manner, is known from DE 100 35 810 A1. The characterizing part of claim 1 of said document seeks protection for the fact that a loading apparatus, which has a carrying platform for receiving articles, in particular pieces of luggage, and a respective rearward and lateral delimitation against which the respectively received article is placed, is arranged at the free end of the carrying arm and that an unloading apparatus is provided that removes the received article from the carrying platform. According to the further details in said document, the carrying platform is in this case embodied in such a way that a foldable delimitation, which is lowered in the carrying platform, is selectively provided at the left or the right side, the movement of the unloading apparatus being coordinated with the movement of the carrying arm and thus of the carrying platform. However, DE 100 35 810 A1 does not disclose how the respective pieces of luggage reach the carrying platform.

Furthermore, an apparatus for gripping luggage, in which pieces of luggage can be raised and conveyed onward either using a, vacuum-actuated, gripping apparatus or by means of a mechanical gripping mechanism, is known from EP 0 841 297 A1. The gripping apparatus or the gripping mechanism is in this case actuated by hand. Automatic gripping of the pieces of luggage is not provided.

Furthermore, a method for loading a container for piece goods with piece goods, which are delivered by a conveyor, by means of an automated handling apparatus which has on an arm on one side a transporting means provided with a support means for the piece goods, is known from DE 10 2005 022 828 A1. According to claim in this method, the piece goods are each moved from a conveyor to the support means which is opened in the process. The piece goods, resting on the support means, are then transferred in a container to a determinable destination where the piece goods are inserted automatically, the support means being extracted, at least for the most Part, from the transporting means, which remains before the destination, under the piece goods. In this case, the handling apparatus is used as a multiaxial robot and the transporting apparatus is embodied as a hand of the robot (claim 2). Furthermore, the conveyor is embodied as a conveying belt from which piece goods are pushed onto the support means by means of a push or pull apparatus (claim 3). In addition, proximity sensors and a camera are used in this known method for monitoring the operation. The support means is embodied in this case as a telescopically extendable and retractable rectangular platform. However, this method merely allows containers to be filled with piece goods. DE 10 2005 022 828 A1 does not disclose how a container which is already loaded with piece goods configured in a broad range of manners and has a lateral opening can be automatically unloaded.

A method for the automated conveying, sorting and loading of pieces of luggage in airport facilities which have a luggage conveying facility which conveys the luggage from a check-in region to a luggage hall, from where it is loaded into airplanes, is known from DE 199 34 095 A1. This method is distinguished in that the relevant data of each piece of luggage are collected substantially in a first step, these data are input into a computer system in a second step, brought to the loading station in accordance with the respective flight destination in a third step, and automatically loaded into loading means with the aid of robots and gripping tools and/or mechanical loading apparatuses in a fourth step. However, DE 199 34 095 A1 does not disclose how the corresponding automated loading tools (claim 12) are configured.

In addition, a vacuum gripping system for gripping an object and a handling apparatus for handling an object with the aid of a vacuum gripping system are known from DE 199 59 285 A1. The starting point for this is a prior art in which the vacuum gripping system (10) has a basic member (18) and at least two suction units (19, 20) which are arranged at right angles to each other and on the basic member (18) and each have at least one suction gripper (21, 22), at least one of the suction units (19) gripping the or each object (11a) to be gripped from above and at least one of the suction units (20) gripping the or each object (11a to be gripped from one side. This vacuum gripping system seeks to achieve the object of being configured and developed in such a way that it can be used to grip without difficulty objects having different dimensions and that the vacuum gripping system can at the same time securely and reliably hold the gripped object. This object is achieved in that the suction units (19, 20) are arranged on the basic member (18) in such a way that, for gripping the at least one object (11a), the distance between the or each suction unit (19) on the upper side of the or each object (11a) and the or each suction unit (20) on the side of the or each object (11a) is variable. As is apparent from the figures and the text part of DE 199 59 285 A1, objects to be handled substantially are cubic bodies which stack up on pallets. In addition, in order to handle predominantly objects of this type, the starting point is also a prior art in which two suction units are arranged substantially fixedly at right angles; this greatly facilitates the handling of cubic bodies, as these also display only right angles. That aside, a substantial part of said document is determined by the configuration of an undergripper (25) which may preferably be used in the handling of smooth cubic bodies, but cannot be used in the handling of a broad range of pieces of luggage and is more of a hindrance than a help. This known vacuum gripping system is obviously not suitable for handling differently configured pieces of luggage, most of which are not smooth cubic bodies but rather rough, uneven containers made of a broad range of materials.

Furthermore, a method for operating a reduced pressure handling means in combination with a programmable controller which can be connected to a machine controller and in which, substantially in a first switching state of the programmable controller (38), the control valve (44) in the gripper module (20) is closed and the reduced pressure in the reduced pressure line (30) leading to the control valve (44) is detected by means of a pressure sensor (78) in the reduced pressure generator (28), is known from DE 10 2004 042 825 B3. This method is intended substantially to achieve the object of proposing a reduced pressure handling apparatus which can be used to grip and raise articles in a simple, safe and rapid manner, wherein reduced pressure is not to be consumed unnecessarily and failure of a component can be promptly detected. Encouragement to remove different pieces of luggage from a container may not be inferred from said document.

SUMMARY OF THE INVENTION

Starting from the indicated prior art, the present invention is therefore based on the object of disclosing a method and an apparatus allowing different pieces of luggage to be automatically removed from a container and placed on a conveying belt using as few staff as possible, and also of automatically bringing about the reverse process, namely the loading of a container with pieces of luggage of different dimensions.

This object is achieved by the apparatus of claim 1 and the method as claimed in claim 9 respectively.

The basic idea of the present invention consists in enabling the technical means which are used by way of specific forms and configurations of grippers and the associated controllers, to grip pieces of luggage, which vary widely in terms of their surface composition and their specific dimensions, and to determine and to use the force which is to be applied in each case for conveyance. Obviously, the human hand is suitable as the best example and as a model of technical means of this type. Imagine the position of a blind person who has to collect the respective pieces of luggage from a container. He is likely first to use his hands to feel what dimensions the respective pieces of luggage have and what the composition of the surface is like in order to gauge whether his hands will slip off during gripping or whether they are able, with reasonable effort, to move the respective load.

In order to technically implement this model of the object to be achieved, namely of practically correctly assessing a piece of luggage, the weight and gripability of which are unknown, and then to move this piece of luggage in the desired direction, the principle of suction cups, which is known from nature, is drawn upon.

As the basic element, a reduced pressure-actuated suction cup is able to raise, substantially in each case as a function of the surface composition of the piece of luggage, the degree of the reduced pressure and the composition of the sealing lip, a specific load in the vertical direction counter to gravity or to pull a specific load in the horizontal direction counter to the frictional force.

In addition, a suction element of this type, as a mechanical replacement for the compressive force exerted by fingers of a hand, allows data about the surface composition and the mass inertia of the touched body to be determined by additional technical sensors and control elements. Thus, in a suction element of this type, pronouncements can be made about the roughness of the surface which is felt via controllable, differently designed and closable admixed air channels. Another possibility is to detect the air pressure and the volume of air conveyed via corresponding measuring apparatuses. Measured values of this type, determined based on known surfaces in preliminary tests, can in practice serve as a decision-making aid for the process of recognizing the type of the piece of luggage provided. Furthermore, after determining the surface composition of a specific piece of luggage, this finding can provide a decision-making aid as to whether it is in the present case beneficial to increase the suction pressure in order to attract or to raise the piece of luggage, or whether the surface is so rough that a force-introducing adhesion is not possible at this point. In this case, it is probably more beneficial to increase the suction pressure at a different point which signals a better-suited point. None of these described functions yet takes account of the fact that the contact pressure of the suction cup in question must be included as a parameter. It will after all be understood that a certain degree of roughness can be overcome by way of an increased contact pressure and can then still lead to a satisfactory force-introducing adhesion.

In order to obtain measured values which can be utilized in terms of data for the described processes, preliminary tests with the most frequent surface materials are, as noted hereinbefore, beneficial. Appropriate pressure sensors are provided on each element for detecting the respective contact pressure of a specific suction element.

BRIEF DESCRIPTION OF THE DRAWINGS

The invention will be described hereinafter in greater detail. In the individual drawings:

FIG. 5 is a detailed view of suction elements according to the invention.

DETAILED DESCRIPTION

Figure 1:
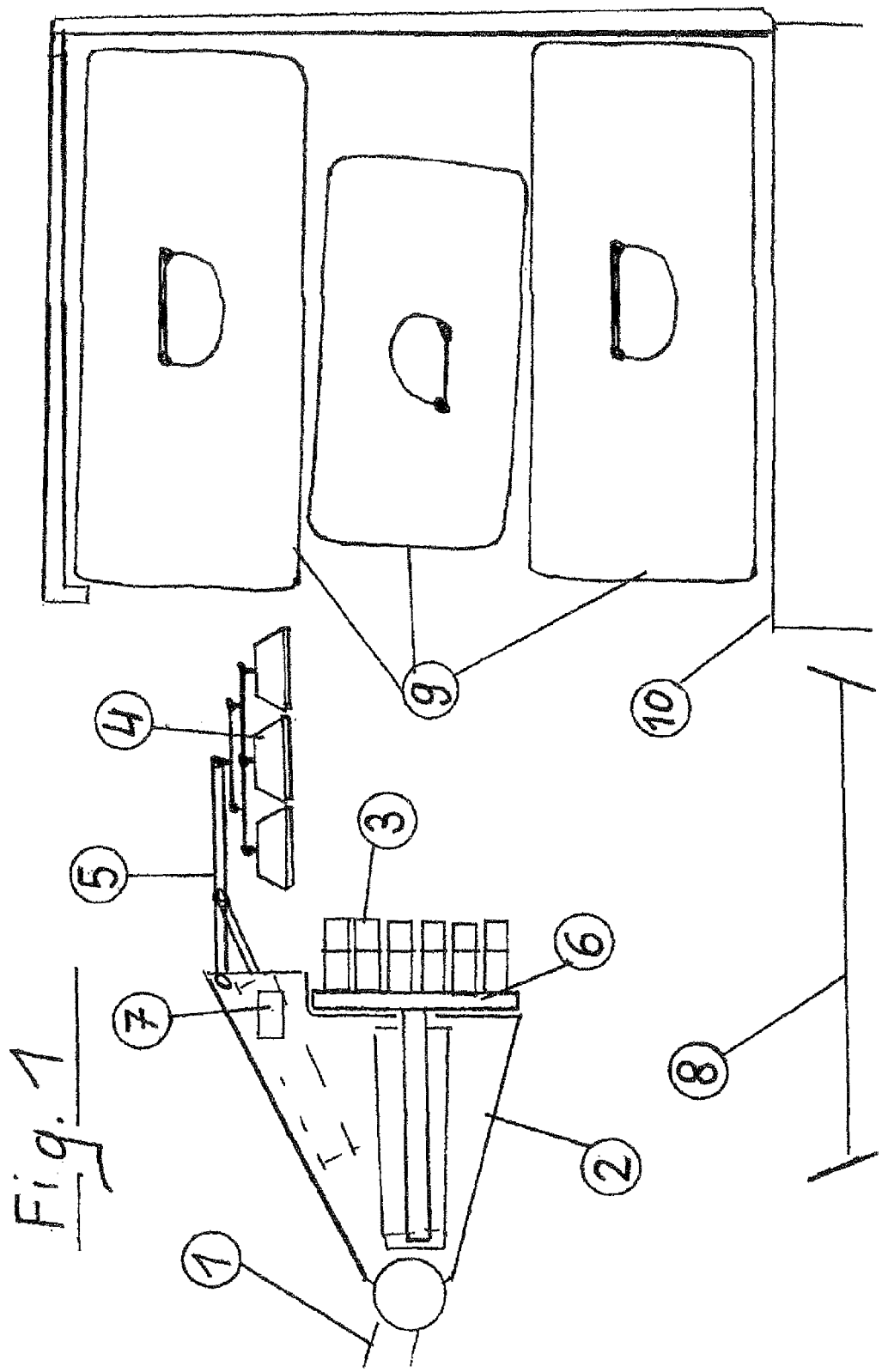
FIG. 1 shows the gripper apparatus in the working position.
Figure 2:
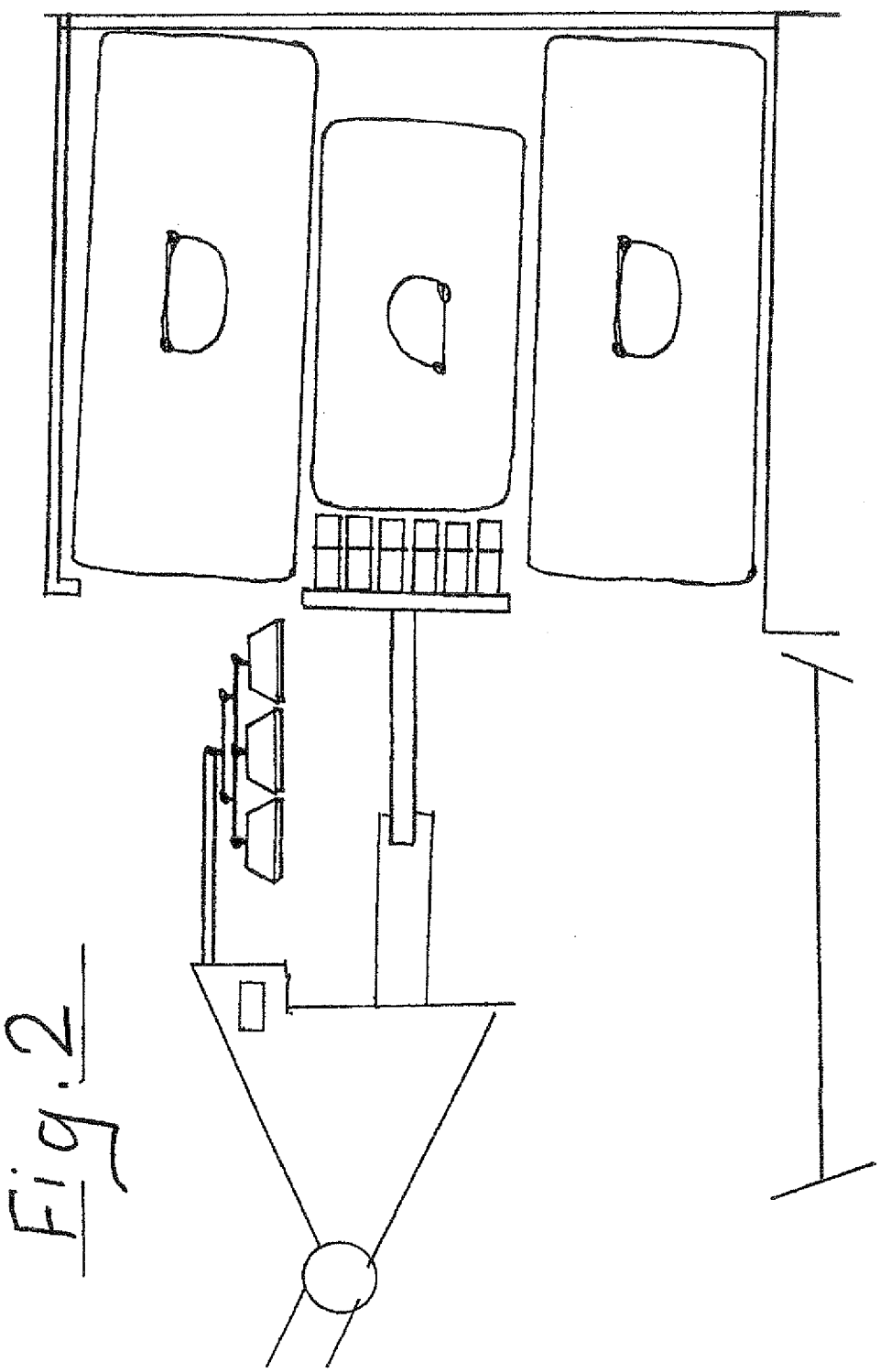
FIG. 2 shows a characteristic operation.
Figure 3:
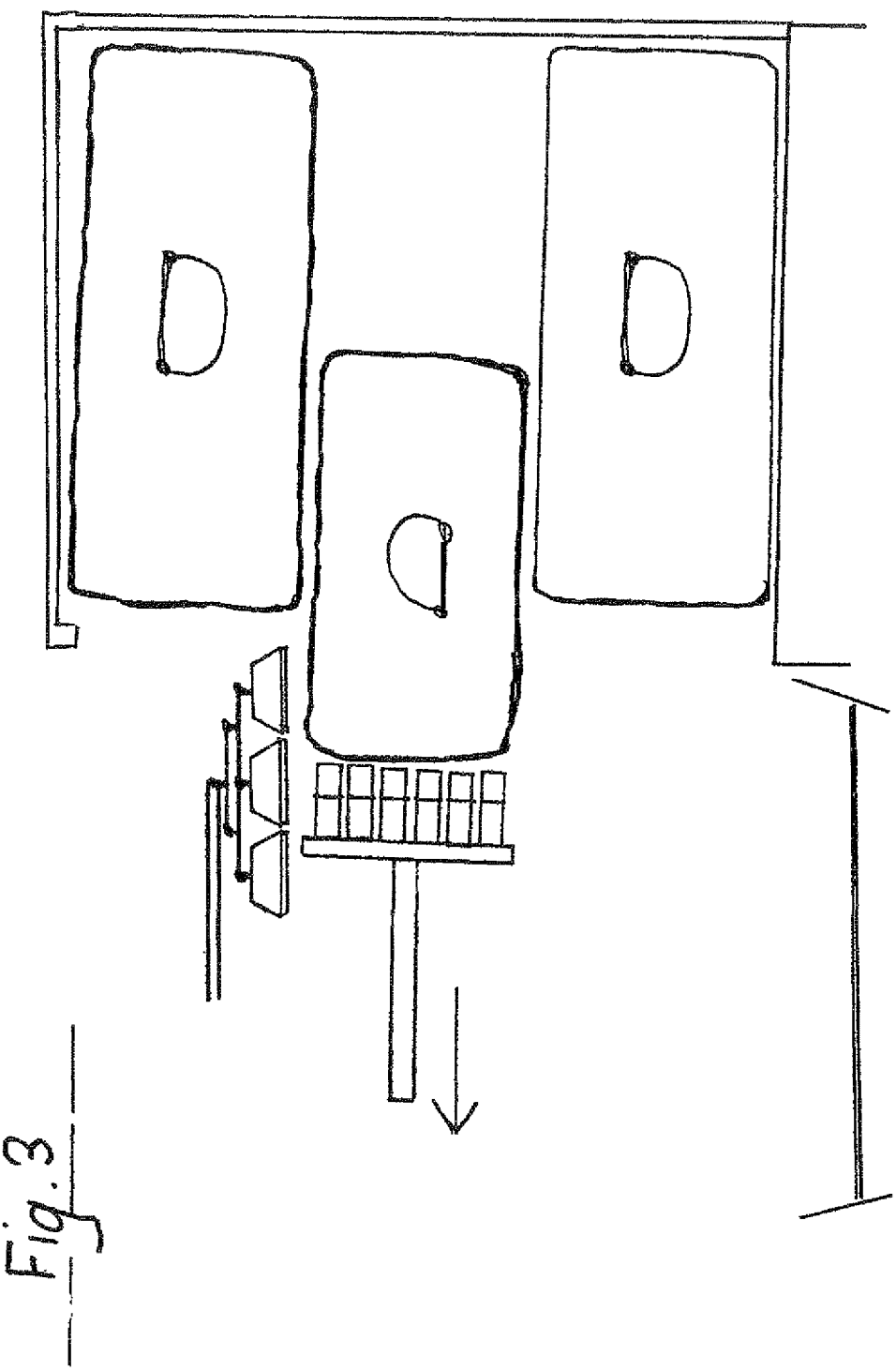
FIG. 3 shows a further operation.
Figure 4:
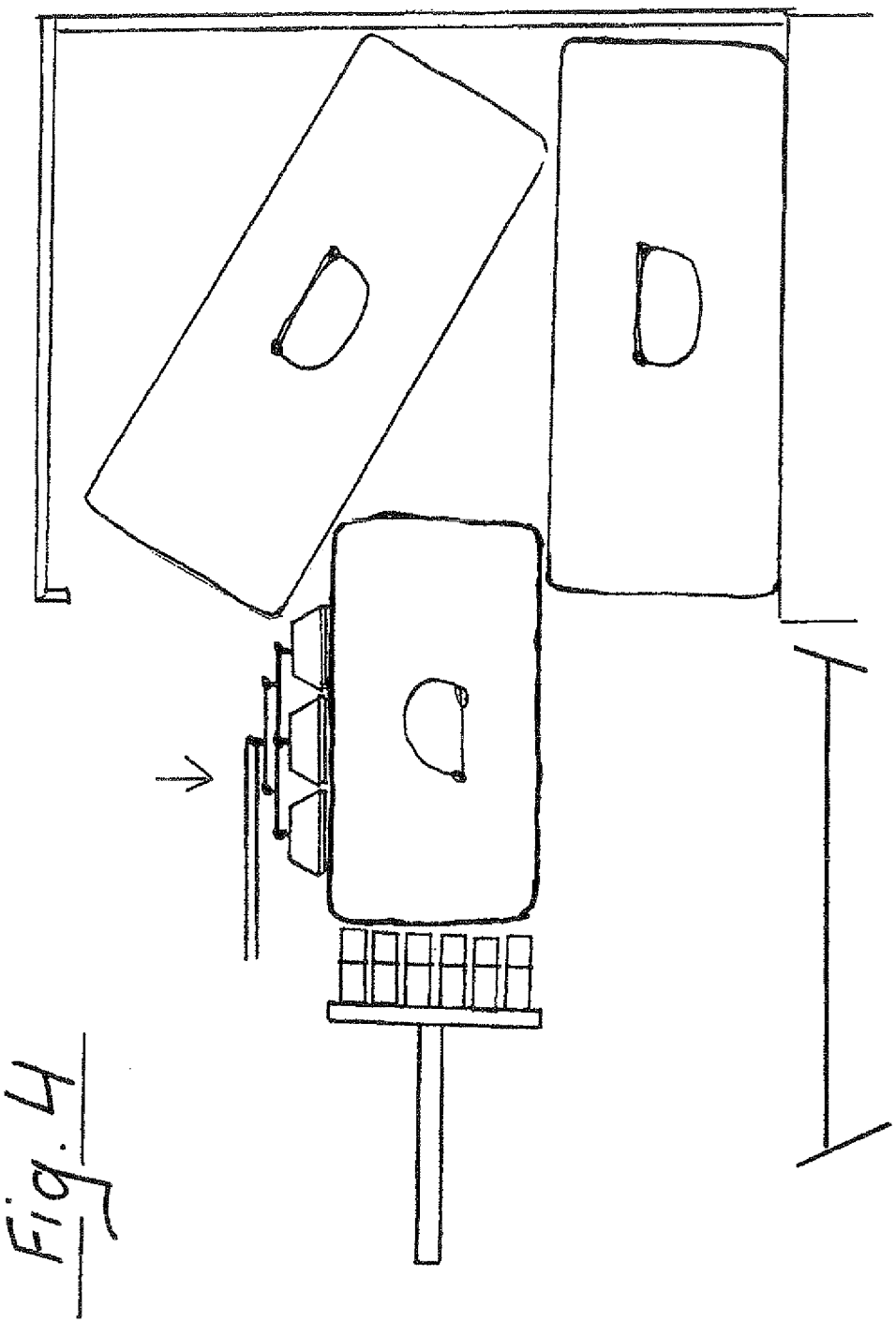
FIG. 4 shows a fully gripped piece of luggage.

FIG. 1 is an illustration of the apparatus according to the invention for gripping and transferring pieces of luggage based on the example of the unloading of a container loaded with three suitcases. The gripper housing (2) is fastened to a multiaxial robot arm (1) which is known to be able to bring the gripper housing into any desired conceivable position. The suction element carrier (6), which carries the substantially horizontally acting horizontal suction elements (3) and applies them as a result of its inherent movement, in combination with the approach position brought about by the robot arm (1), is the first thing to become active in the case shown. The reason for this is that it is apparent that the first piece of luggage (9) can, as is shown in FIG. 2 and later in FIG. 3, be conveyed out only horizontally in the container (10) shown. This is also possible only in the central piece of luggage (9) shown, as expediently allowance must be made for the fact that, as indicated in FIGS. 2 to 4, the top piece of luggage can become caught on an edge of the upper part of the respective container. In the case of pieces of luggage positioned further down, there would be little point trying to unload, as such a piece of luggage is additionally loaded by the weight of the pieces of luggage positioned thereabove. Of course, the conveying belt (8), which was indicated by way of example for the possible onward transportation, does not have to be located in direct proximity to the container (10) of the pieces of luggage (9), as the range of the robot arm (1) would also allow a transfer to more remote regions. The vertical suction elements (4) arranged on the suction element carrier (5) are, as is also clear from FIG. 1, shaped differently from the horizontal suction elements (3). This concerns substantially the size of the suction area. The vertical suction element carrier (5) may be moved, in addition to the movements which can be performed by the gripper housing (2), not only in the vertical direction via the articulated push rod (not designated in greater detail) but also in a relatively wide range in the horizontal direction. This is for example necessary for the case in which the suction element carrier (6) has gripped a piece of luggage and withdrawn it somewhat, but the vertical suction elements (4) have not yet sufficiently gripped the surface of a piece of luggage (9). In this case, the electronic controller recognizes the need to transfer the suction element carrier (5), the vertical suction elements (4), which are accordingly active, are released, the suction element carrier (5) is moved sideways and/or forward or backward, and the vertical suction elements (4) become active again. In difficult cases, this process must be repeated.

In principle, the same process is also possible in the horizontal suction elements (3). For this purpose, the suction element carrier (6) is horizontally displaceable and/or rotatable. Based on the indicated processes, it is apparent that the suction element carrier (6) and the suction element carrier (5) can operate largely independently of each other. The sensor (7) is critical for controlling the movement of the gripper housing (2). The sensor (7) is in this regard representative of a group of sensors which may be designed in all known forms of distance sensors. From an ultrasonic sensor via light sensors, microwave sensors are also conceivable, depending in each case on the specific requirements for use. For collision safety reasons too, the entire closer circumferential region of the gripper housing (2) can also be monitored by the group of sensors (7). FIG. 2 shows how horizontal suction elements (3) have gripped a piece of luggage and the grip of the horizontal suction elements (3) is sufficient to pull a first piece of luggage (9) from the container (10).

In the illustration of FIG. 3, this process is already advanced; the suction element carrier (5) can attach some of the vertical suction elements (4) and assist the process of withdrawing a piece of luggage (9) in such a way that, on the one hand, the piece of luggage is raised somewhat and, on the other hand, the suction element carrier (5), which is designed substantially for vertical carrying loads, assists the withdrawal of the piece of luggage (9) by way of an additional movement of the gripper head (2). Another possibility consists in enabling for such cases the suction element carrier (6) to move horizontally, irrespective of the movements of the gripper housing (2). As the process of withdrawing a piece of luggage (9) progresses, the vertical suction elements (4) of the vertical suction element carrier (5) are released and the carrier (5) thereof is reattached.

However, this process can be continued only until either all the vertical suction elements (4) have gripped a piece of luggage (9) or there is a risk of the piece of luggage (9) in question tilting. In order to promptly detect this moment, which becomes apparent long in advance, sensors (which are not designated in greater detail and for the sake of clarity are not illustrated in greater detail), which perform the function of scales, are provided in the gripper housing and/or the suction element carrier (5) or the suction element carrier (6). As the described withdrawal process is carried out in precisely apportioned steps, this moment is thus easy to detect in terms of control.

FIG. 4 shows how a piece of luggage (9) is fully gripped by both suction element carriers and the dropping of the next piece of luggage (9) is imminent. The onward conveyance, which is carried out without difficulty, of the gripped piece of luggage (9) to the respective desired destination is not examined any further in this figure.

FIG. 5 shows by way of example three individual horizontal suction elements (3) acting in an assembly. The sealing lip (11) is made in this case of a highly compressible material such as rubber or a suitable plastics material, for example. The force with which the sealing lip touches the respective pieces of luggage is applied directly by the telescoping spring (15) which is placed around the shank (14) of a suction element. In the present case, this force is caused indirectly by the suction element carrier (6) or the gripper housing (2). The stop valve (12) interacts with the valve spring (13), the bias of which may be set via the settable adjusting element (18). In principle, use may conceivably be made for this purpose of an electrically actuated spindle drive, the respective position of which is determined via a sensor. In order to additionally make, in special cases, the pressure of the telescoping spring (15) settable and checkable, an apparatus is provided for this purpose that corresponds to the valve spring (13) in the setting of the bias. An appropriate flow meter (16), the measured data of which can be continuously retrieved, is provided for detecting the air flow flowing in the respective suction extraction channel (19). The method according to the invention ensures that not only relatively flat and smooth surfaces can be gripped by the suction elements, but rucksacks, for example, with uneven and oblique surface parts can also be gripped. In a particular configuration of the invention, this is achieved by tilting elements located either at the base point of the respective suction element carriers and/or at the base point of individual suction elements (3, 4). In addition, the apparatus according to the invention can be monitored via a camera system. If the gripping and transferring process relates to containers which are open at the top, the pieces of luggage are easier to grip, as the suction elements need merely grip pieces of luggage from above. It is determined how low the front faces of the individual pieces of luggage are mounted in the container during the assessment of position at the beginning of a detection process via a type of "terrain model with detection of vertical positions" and corresponding sensors in order to decide which piece of luggage to grip first. This decision is made based on these data, the simultaneously determined composition of the respective surface of the piece of luggage in question and the weight estimated from the size of the surface in question.

The control of the described complex movement sequences and access to data memories, which become larger and larger as the number of experimental values increases, requires a special control program.

LIST OF REFERENCE NUMERALS (1) robot arm
(2) gripper housing
(3) horizontal suction element
(4) vertical suction element
(5) suction element carrier (vertical)
(6) suction element carrier (horizontal)
(7) sensor
(8) conveying belt
(9) piece of luggage
(10) container
(11) sealing lip
(12) stop valve
(13) valve spring
(14) suction element—shank
(15) telescoping spring
(16) flow meter (measuring the air flow)
(17) distance meter (for example based on ultrasound)
(18) adjusting element (spring bias)
(19) suction extraction channel

The invention claimed is:

1. An apparatus for automatically removing pieces of luggage which differ in terms of their surface composition and their specific dimensions and for preparing for onward transportation by means of a gripper housing which is articulated to a robot arm and has suction elements, comprising:
   a) a robot arm articulated to a gripper housing (2), comprising a horizontal suction element carrier (6) with at least one horizontal suction element (3) and a vertical suction element carrier (5) with at least one vertical suction element (4), wherein the vertical suction element carrier (5) comprises a push rod in the vertical direction, and the horizontal suction element carrier (6) is horizontally displaceable relative to the gripper housing (2),
   b) the suction elements (3, 4) that are individually controlled and actively provide information to a control center by way of respective suction processes,
   wherein both the horizontal suction element carrier (6) and the vertical suction element carrier (5) have in adjacent regions differently configured suction elements,
   wherein at least one suction element (3, 4) has at least one activatable adjusting element (18) for setting a spring bias, and
   wherein removal of the pieces of luggage is visualized in 3D and real time by an image recognition system.

2. The apparatus as claimed in claim 1, wherein the horizontal suction element carrier (6), the vertical suction element carrier (5), or both, comprise arrays of suction elements.

3. The apparatus as claimed in claim 1, wherein at least one suction element (3, 4) comprises at least one flow meter (16) for measuring the suction air flow, a measuring means for measuring pressure of the suction air flow, or both.

4. The apparatus as claimed in claim 1, wherein at least one suction element (3, 4) has at least one activatable adjusting element (18) for setting the spring bias, wherein this setting can be detected in real time.

5. The apparatus as claimed in claim 1, wherein at least one suction element (3, 4) has at least one suction extraction channel (19), the cross section of which can be set in a variable manner, wherein this setting can be detected in real time.

6. The apparatus as claimed in claim 1, wherein at least one suction element (3, 4) has at least one distance meter (17), wherein a measurement result of the at least one distance meter (17) can be detected in real time.

7. The apparatus as claimed in claim 1, wherein the vertical suction elements (4) are shaped differently from the horizontal suction elements (3).

8. The apparatus as claimed in claim 1, wherein tilting elements are located at the base point of the respective suction element carriers, at the base point of individual suction elements (3, 4), or both.

9. The apparatus according to claim 1, wherein the control center comprises a controller for controlling horizontal movement of the horizontal suction element carrier (6) between an extended position for gripping a side of an object and a retracted position for pulling the object toward the gripper housing.

10. The apparatus according to claim 1, wherein the control center comprises a controller comprising machine-readable carrier comprising a non-transitory computer program for causing the apparatus to carry out the method steps of claim 11.

11. A method for automatically removing pieces of luggage which differ in terms of their surface composition and their specific dimensions and for preparing for onward transportation comprising a gripper housing which is articulated to a robot arm and has suction elements, comprising:
   a) moving the gripper housing (2) and the container to be emptied close to each other, wherein a plurality of pieces of luggage are disposed within said container,
   b) determining a piece of luggage to be removed from the container,
   c) gripping the piece of luggage with the horizontal suction element carrier (6) in combination with the horizontal suction elements (3) and withdrawing the piece of luggage from the container by retracting the horizontal suction element carrier (6) toward the gripper housing (2) from an extended position, d) if the vertical suction elements (4) are not yet able to sufficiently grip the piece of luggage:

repositioning the vertical suction element carrier (5) and deactivating the vertical suction elements (4), regripping the piece of luggage by moving the vertical suction element carrier (5) at least one of sideways, forward and backward, and reactivating the vertical suction elements (4) again, and if necessary, repeating step d) until the piece of luggage is securely gripped by both the horizontal suction element carrier (6) and the vertical suction element carrier (5).

12. The method as claimed in claim 11, wherein the suction elements (3, 4) have means for measuring air throughput (16) and transmitting measured values of air throughput, and also means for setting and providing feedback on a spring bias (18).

13. The method as claimed in claim 11, wherein at least one of said horizontal suction elements (3) comprises a suction cup, and a contact pressure of the suction cup is detected as a parameter by way of preliminary tests with surface materials used for luggage.

14. The method as claimed in claim 11, further comprising, determining how low front faces of individual pieces of luggage are positioned in the container during the determining step via a terrain model by detecting vertical positions using corresponding sensors.

15. The method as claimed in claim 11, wherein the method is used for unloading and/or loading stationary or movable containers, or moving containers.

16. The method as claimed in claim 11, wherein at least one of the gripper housing, the vertical suction element carrier (5) and the horizontal suction element carrier (6), comprise sensors, which function as scales.

17. The method as claimed in claim 11, wherein a loading situation is detected by a computer system and is made using a data-related basis of an automatic detection process.

18. The method according to claim 11, wherein the first piece of luggage to be removed is not the top piece of luggage.

19. The method according to claim 11, wherein the withdrawing step comprises, withdrawing said piece of luggage horizontal as tar as possible without the piece of luggage falling out of the container.

20. A non-transitory, machine-readable carrier with a program code of a computer program for carrying out the method as claimed in claim 11 when the program is run in a computer.

* * * * *